US008771063B1

(12) United States Patent
Boyle

(10) Patent No.: US 8,771,063 B1
(45) **Date of Patent: *Jul. 8, 2014**

(54) METHOD AND SYSTEM FOR MANAGING GAMES IN A MOBILE VIRTUAL CASINO

(71) Applicant: Joingo, LLC, San Jose, CA (US)

(72) Inventor: Stephen S. Boyle, Lincoln, CA (US)

(73) Assignee: Joingo LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,376

(22) Filed: Feb. 17, 2013

Related U.S. Application Data

(60) Provisional application No. 61/713,674, filed on Oct. 15, 2012.

(51) Int. Cl.
*A63F 9/24* (2006.01)
*A63F 13/12* (2006.01)

(52) U.S. Cl.
CPC .................................... *A63F 13/12* (2013.01)
USPC .............................................. 463/29; 463/42

(58) Field of Classification Search
CPC ............ G07F 17/3293; G07F 17/3286; G07F 17/3209; G07F 17/3218; G07F 17/34; A63F 2003/008; A63F 2300/5573
USPC ..................................................... 463/42, 29
See application file for complete search history.

(56) References Cited

U.S. PATENT DOCUMENTS

| | | | | |
|---|---|---|---|---|
| 8,172,687 | B2 | 5/2012 | Gagner et al. | |
| 8,221,241 | B2 | 7/2012 | Davis et al. | |
| 8,267,792 | B2 * | 9/2012 | Buchholz et al. | 463/42 |
| 2002/0147049 | A1 * | 10/2002 | Carter, Sr. | 463/42 |
| 2004/0242322 | A1 * | 12/2004 | Montagna et al. | 463/29 |
| 2005/0181870 | A1 * | 8/2005 | Nguyen et al. | 463/29 |
| 2007/0202941 | A1 * | 8/2007 | Miltenberger et al. | 463/25 |
| 2009/0098925 | A1 * | 4/2009 | Gagner et al. | 463/20 |
| 2010/0178986 | A1 * | 7/2010 | Davis et al. | 463/42 |
| 2010/0304841 | A1 * | 12/2010 | Sammon et al. | 463/25 |
| 2012/0149463 | A1 | 6/2012 | Jabara et al. | |

* cited by examiner

*Primary Examiner* — Steve Rowland
(74) *Attorney, Agent, or Firm* — Clause Eight IPS; Michael Catania

(57) ABSTRACT

A method and system for management of a virtual casino game whether the game logic resides on a mobile device or on a server is disclosed herein. The system is comprised of a mobile device, a native application for a virtual casino residing on the mobile device, a game server, a player accounts database, and a network. The location and player authentication information is transmitted to the game server and a virtual casino game is launched once the location and player authentication is verified.

3 Claims, 6 Drawing Sheets

| WagerAcct | LoyaltyProg | Credits |
|---|---|---|
| 19823 | A | 550 |
| 771 | B | 10,818 |
| 1713 | A | 9,075 |
| 1823 | C | 115 |
| 11223 | C | 925 |

METHOD AND SYSTEM FOR MANAGING GAMES IN A MOBILE VIRTUAL CASINO

CROSS REFERENCES TO RELATED APPLICATIONS

The present application claims priority to U.S. Provisional Patent Application No. 61/713,674, filed on Oct. 15, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to managing games in a mobile virtual casino. More specifically, the present invention relates to a method and system for managing games in a mobile virtual casino on a mobile communication device.

2. Description of the Related Art

Recently gambling authorities have begun to permit gambling on mobile phones. However, there is a need to verify that the gambler is within a gambling authority's jurisdiction. Further, there is a need to prevent fraud on the virtual casino.

General definitions for terms utilized in the pertinent art are set forth below.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

APP is a software application for a mobile phone such as a smart phone.

BLUETOOTH technology is a standard short range radio link that operates in the unlicensed 2.4 gigaHertz band.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Code Division Multiple Access ("CDMA") is a spread spectrum communication system used in second generation and third generation cellular networks, and is described in U.S. Pat. No. 4,901,307.

Direct Inward Dialing ("DID") involves a carrier providing one or more trunk lines to a customer for connection to the customer's private branch exchange ("PBX") and a range of telephone lines are allocated to this line.

GSM, Global System for Mobile Communications is a second generation digital cellular network.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

Mobile Originated ("MO") is a text message that is sent from a mobile phone.

Mobile Terminated ("MT") is a text message that is sent to a mobile phone.

Mobile App is an application program resident on a mobile device.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by verifying the authenticity of a web site.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Voice over Internet Protocol ("VoIP") relates to voice communications (e.g. telephone calls) transmitted over the Internet such as SKYPE call.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Gaming on mobile devices creates jurisdiction verification problems for the gambling authorities and fraud prevention problems for the gaming establishments.

BRIEF SUMMARY OF THE INVENTION

The present invention allows for management of a virtual casino game whether the game logic resides on a mobile device or on a server.

The present invention is generally a system configured to give casino operators a way to host and manage mobile casino games for use by their players. The system is comprised of a player mobile device having mobile data communications capability, and is connected to the mobile data network. A native mobile application downloaded to the mobile device which has access to the GPS interface among others. A collection of application content representing the casino's virtual gaming floor, marketing, etc. The application content contains navigation to the virtual casino floor and descriptions of each of the available virtual casino games. The application comprises a touch screen navigation button for each of the virtual casino games, which are used to launch each of the virtual casino games on the mobile device. Once the game launch button is pressed, the native application queries the device GPS to collect the location information, then creates a secure connection to the game server and passes the location and player authentication information to the game server and requests the game be launched. In the process of launching the game, the game server queries the network operator on which the mobile device resides and receives the network's approximation on the geographical location of the mobile device. If the GPS and communication network locations are equal within a predefined tolerance, the game server launches the game and begins play. The mobile game queries the game server for starting credits and limitations which results in the game server contacting the player's wager account to verify credit and wager and then displays the balance information and the game begins. Each wager is again tagged with a GPS location and authentication as it is sent down to the game server. The game server queries the network location and confirms the GPS, checks the credit balance on the account, rules and limitations, and then executes the wager and returns the result to the game.

One aspect of the present invention is a method for managing games in a mobile virtual casino. The method includes launching a mobile game from a native mobile application on a mobile communication device. The mobile game is one of a plurality of mobile games on the native mobile application. Each of the plurality of mobile games comprises a button to launch the mobile game. The method also includes determining a GPS location for the mobile communication device. The method also includes creating a secure connection over a network between the mobile communication device and a game server. The method also includes authenticating an identity of the player on the mobile communication device. The method also includes transmitting the identity of the player and the location of the mobile communication device from the mobile communication device to the game server. The method also includes requesting from a communications network operator for the mobile communication device a geographical location for the mobile communication device. The method also includes determining that the GPS location and the geographical location are within a predetermined tolerance. The method also includes transmitting a user-interface of the mobile game from the game server to the mobile communications device over the network. The method also includes packaging and transmitting an action of the player and a wager from the mobile device to the game server. The method also includes authenticating the player, and confirming sufficient credit for the wager at a database of a loyalty site. The method also includes tagging each wager with a GPS location and authentication at the mobile communication device.

Another aspect of the present invention is a system for managing games in a mobile virtual casino. The system includes a mobile device, a communications network, a communication network server, a player accounting database, and a game server. The mobile device comprises a native mobile application and a GPS component. The native mobile application is in communication with the GPS component. The native mobile application comprises a plurality of application content comprising a casino virtual gaming floor, marketing, navigation to the casino virtual gaming floor, a plurality of descriptions of each casino game, and a plurality of navigation buttons to each casino game. The native mobile application is configured to determine a GPS location of the mobile device and authenticate a player. The communication network server is configured to determine a network location of the mobile device on the communications network. The player accounting database comprises a plurality of wager accounts. Each of the plurality of wager accounts comprises loyalty program information and marketing credit information for a player. The game server is in communication with native mobile application, the communications network server, and the player accounting database. The game server is configured to request from the communications network server the network location of the mobile device. The game server is configured to contact the wager account of the player to verify credit and wager and displays the balance information. Each wager of the player is tagged with a GPS location and authentication as transmitted to the game server from the mobile native application on the mobile device. The game server queries the network location and confirms the GPS location, checks the credit balance on the account, rules and limitations, and executes the wager and returns the result to the game on the mobile native application of the mobile device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
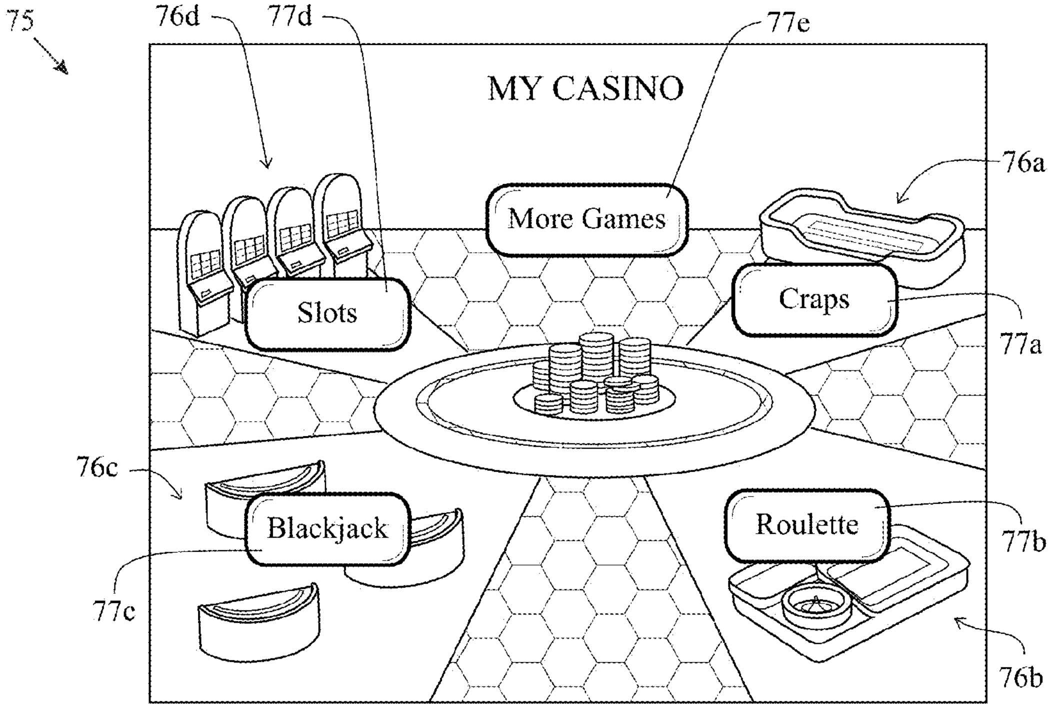
FIG. 1 is an illustration of a virtual casino game on an application of a mobile device.

As shown in FIG. 1, a virtual casino on a native application 75 on a mobile device 25 has various virtual casino games 76 including but not limited to slots 76*d*, craps 76*a*, roulette 76*b*, blackjack 76*c* and others such as pai gow. Each game preferably has a touch screen navigation button for accessing the game: 77*a* for craps, 77*b* for roulette, 77*c* for blackjack, 77*d* for slots and 77*e* for more games. The virtual casino game native application 75 is operated by a gambling entity. This allows a player to gamble on a mobile device 25 without being present at a physical location of a casino. However, the virtual casino game native application 75 verifies the geographical location of the mobile device 25 to prevent gambling outside of an authorized jurisdiction, and prevents fraud against the gambling entity as explained in detail below.

Figure 2:
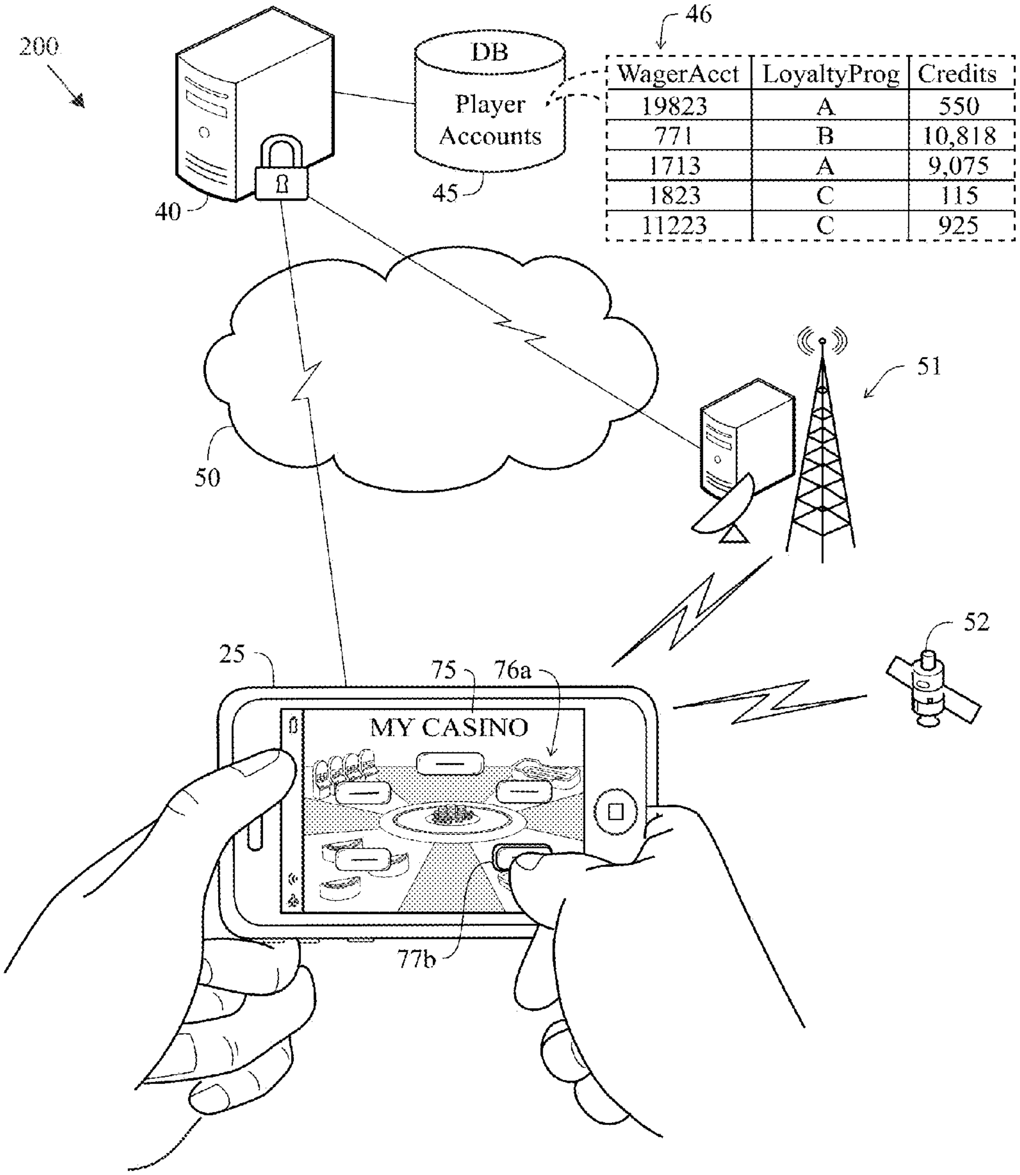
FIG. 2 is a block diagram of a system for managing games in a mobile virtual casino.

As shown in FIG. 2, a system for a managing a virtual casino game is generally designated 200. The system 200 is preferably comprised of a multiple mobile communication devices 25, a communications server and communications network 51, a game server 40, and a player accounts database 45 at a real casino site. GPS satellites 52 provide GPS location data to the system 200 for verifying the geographical location of the mobile communication device 25. A patron plays a game 76 of the native application 75 for a virtual casino on a mobile communication device 25.

The patron (aka gambler) has already established a relationship with the casino and has an account 46 that is stored at the players account database 45 of the casino. The player maintains a balance of funds in the player's account, which the player can use for playing virtual casino games on a mobile communication device.

The mobile communication devices 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Hypertext Transfer Protocol Secure ("HTTPS"), or other similar protocols. The transmission protocol ranges from SIP to MGCP to FTP and beyond. The protocol at the game server 40 is preferably HTTPS.

A mobile communication service provider (aka phone carrier) of the customer such as VERIZON, AT&T, SPRINT, T-MOBILE, and the like mobile communication service providers, provide the communication network for communication to the data capable communication device of the customer. An example of a mobile phone location software/service is WAVEMARKET.

Figure 4:
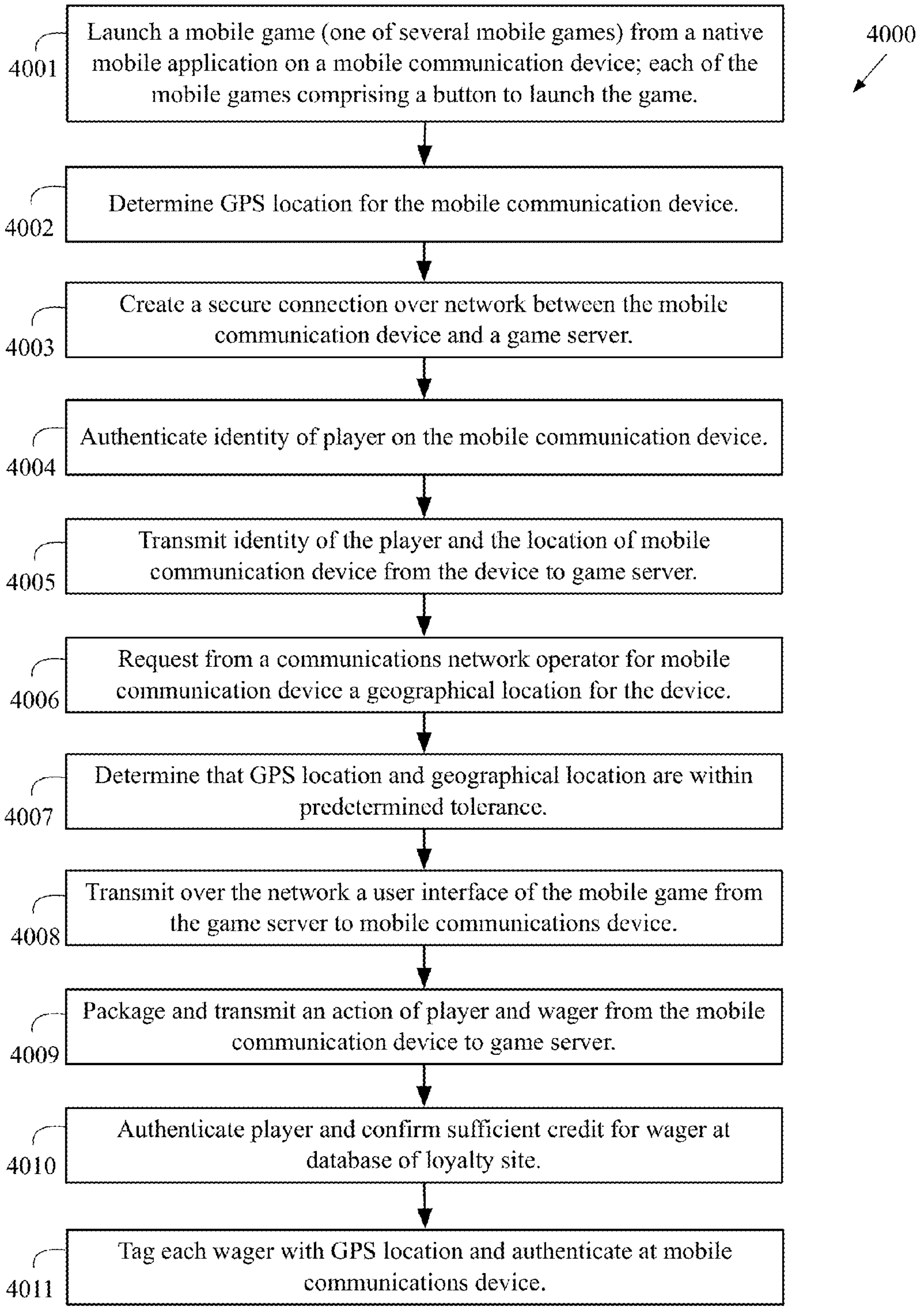
FIG. 4 is a flow chart for a method for managing games in a mobile virtual casino.

A flow chart of a method for managing a virtual casino game is shown in FIG. 4. The method 4000 begins at block 4001 with launching a native application on a mobile device for virtual casino game. The virtual casino game is one of a plurality of virtual casino games on the native mobile application. Each of the plurality of virtual casino games comprises a button to launch the virtual casino game. At block 4002, a GPS location for the mobile communication device is determined by the GPS component of the mobile device. At block 4003, a secure connection is created over a network between the mobile communication device and a game server. At block 4004, an identity of the player on the mobile communication device is authenticated. At block 4005, an identity of the player and the location of the mobile communication device is transmitted from the mobile communication device to the game server. At block 4006, a geographical location for the mobile communication device is requested from a communications network operator for the mobile communication device. At block 4007, the game server determines if the GPS location and the geographical location are within a predetermined tolerance. At block 4008, a user-interface of the mobile game is transmitted from the game server to the mobile communications device over the network. At block 4009, an action of the player and a wager is packaged and transmitted from the mobile device to the game server. At block 4010, the player is authenticated, and sufficient credit for the wager at a database of a loyalty site is confirmed by the game server. At block 4011, each wager is tagged with a GPS location and authentication at the mobile communication device.

Figure 3:
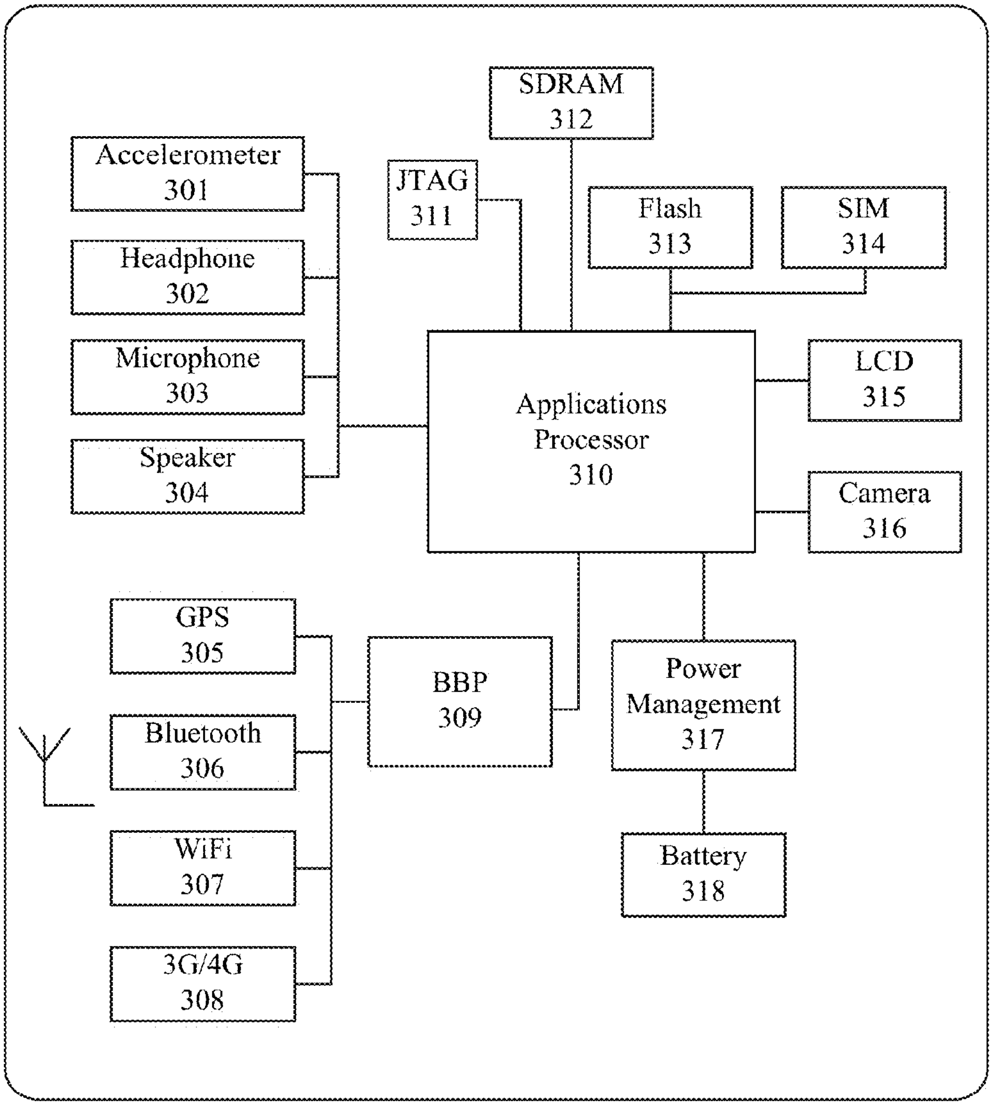
FIG. 3 is a block diagram of components of a mobile device.

As shown in FIG. 3, a typical mobile communication device includes an accelerometer 301, a head phone 302, a microphone 303, a speak 304, a GPS chipset 305, a Bluetooth component 306, a WiFi component 307, a 3G/4G component 308, a BaseBand Processor (for radio control) 309, an applications processor 310, a JTAG (debugger) 311, a SDRAM memory 312, a Flash memory 313, SIM card 314, LCD display 315, a camera 316, a power management circuit 317 and a battery or power source 318.

On an IPHONE® device from Apple, Inc., the "UDID," or Unique Device Identifier is a combination of forty numbers and letters, and is set by Apple and stays with the device forever.

On an ANDROID based system, one that uses Google Inc.'s ANDROID operating system, the ID is set by Google and created when a user first boots up the device. The ID remains the same unless the user does a "factory reset" of the phone, which deletes the phone's data and settings.

Those skilled in the pertinent art will recognize other identifications, (e.g. MEID) associated with mobile communication devices which can be used to generate a device ID for use by the present invention.

Figure 5:
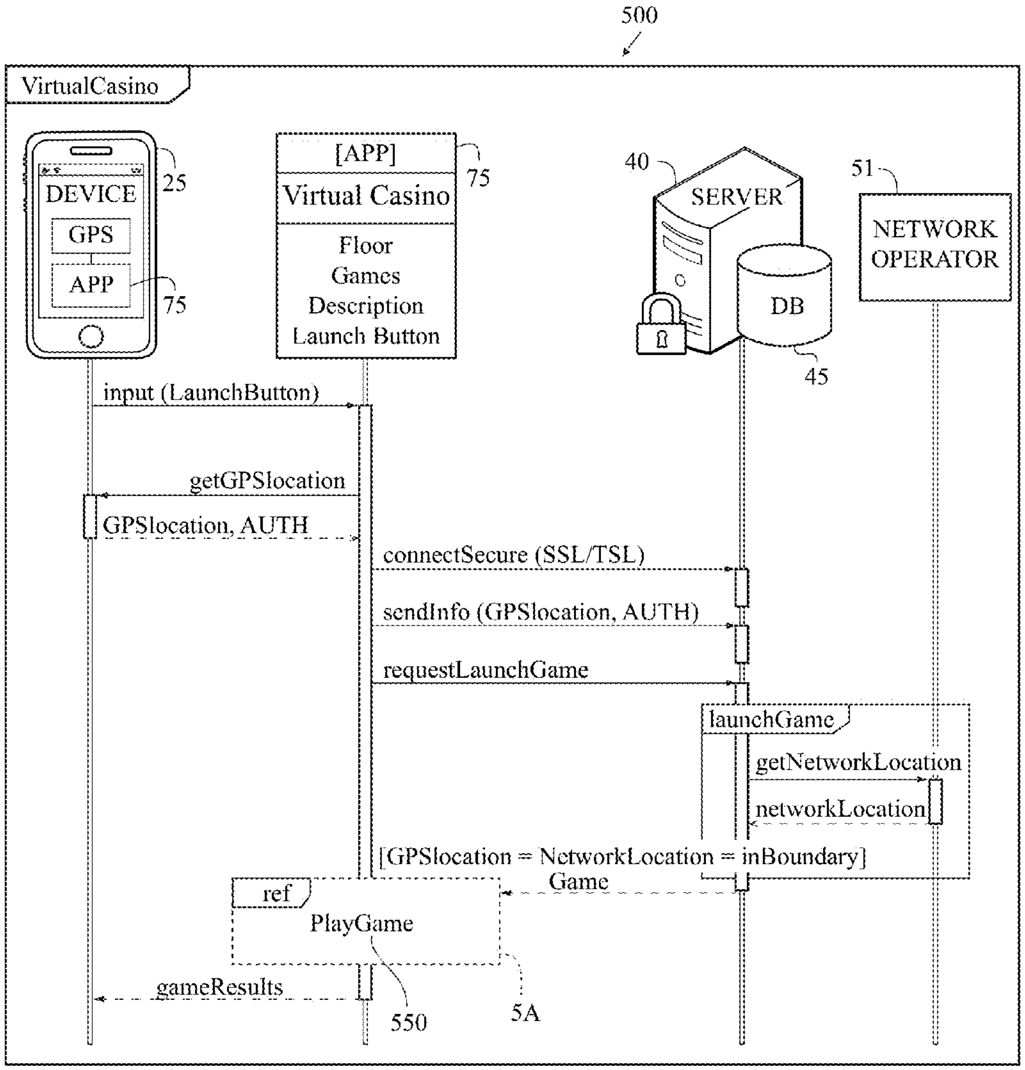
FIG. 5 is a sequence diagram of communications within a system for managing games in a mobile virtual casino.

FIG. 5 is a sequence diagram 500 of the communications preferably involved in the system for managing games in a mobile virtual casino. The end user activates a downloaded native application 75 for a virtual casino on a mobile device 25. The end user selects a virtual casino game from the virtual casino games available on the application 75 by pressing a touch screen navigation button. The selection of a casino game results in the native application 75 querying the GPS component 305 of the mobile device 25 to collect the geographical location information for the mobile device 25. The native application 75 then creates a secure connection over a network with the game server 40. The native application 75 transmits the GPS location information and player authentication information to the game server 40. The player authentication information is preferably a player name, casino loyalty account number, and mobile device identification number. The end user/player preferably uploads this information to the native application prior to use. Alternatively, the native application 75 downloads the information from the player account database during a prior session. Still alternatively, the information is downloaded with the download of the native application 75. The native application 75 then requests the selected virtual casino game to be launched.

During the launch game stage, the game server 40 queries the communications network 51 on which the mobile device 25 operates for the geographical location of the mobile device 25. The communications network utilizes triangulation, nearest cell tower data, or the like to provide an approximate geographical location of the mobile device 25. The communications network 51 transmits the approximate geographical location of the mobile device 25 to game server 40. The game server 40 then determines if the geographical location provided by the native application 75 on the mobile device 25 is within a predefined boundary of the approximate geographical location of the mobile device 25 provided by the communications network 51. If the game server 40 determines that the geographical locations are within the predefined boundary, and if the location is within a permitted gambling jurisdiction, such as the State of Nevada, then the game server 40 launches the virtual casino game for the native application 75.

Figure 5A:
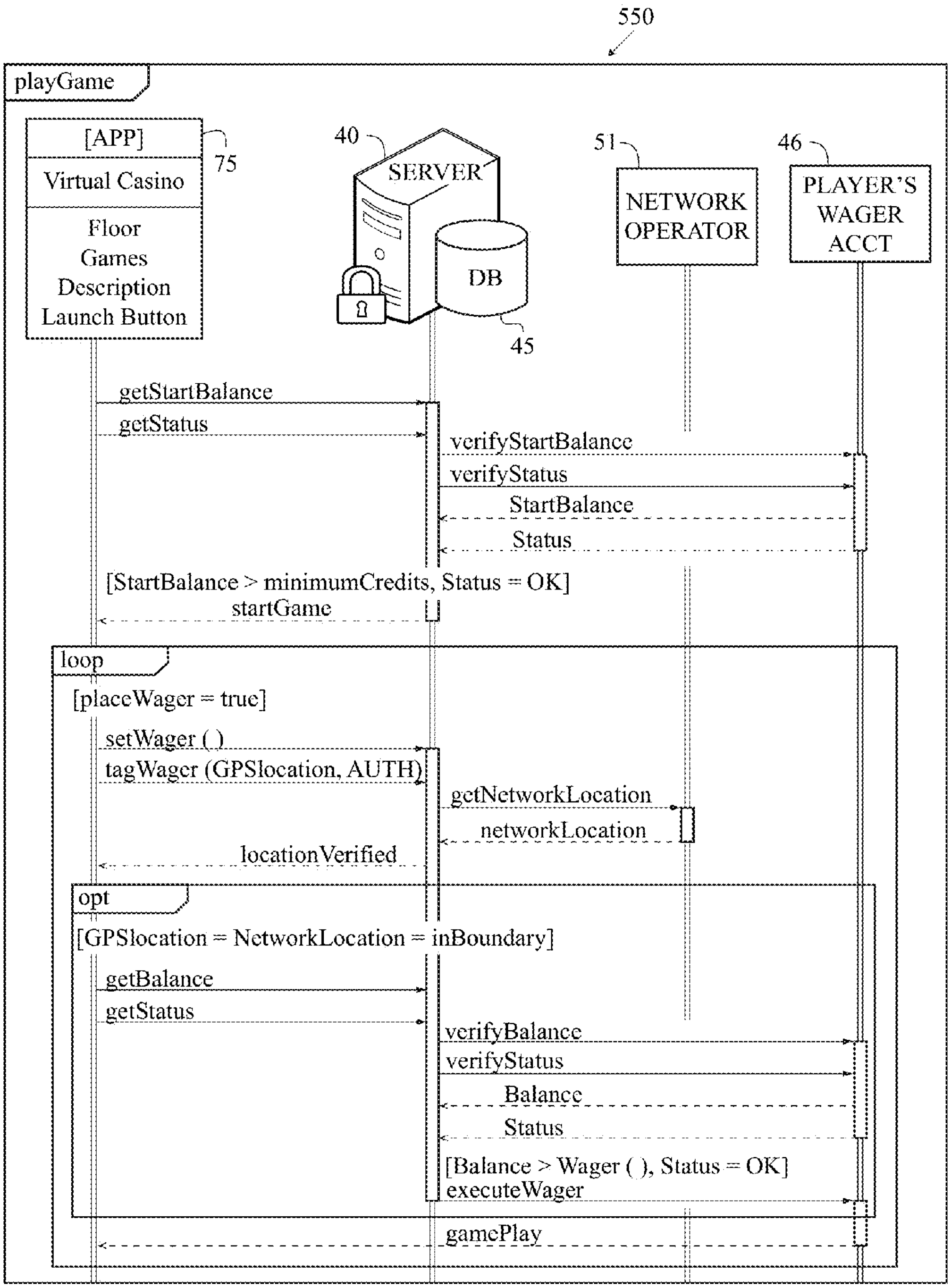
FIG. 5A is a sequence diagram of communications within a system for managing games in a mobile virtual casino.

The PlayGame stage is set forth in FIG. 5A. The virtual casino native application 75 queries the game server 40 for starting credits and game limitations for the virtual casino game 76 selected by the end user/player. Depending on the jurisdiction, the virtual casino game may have wager limitations, game rule limitations (e.g., splitting cards in blackjack), or the like.

The game server 40 then queries the database 45 to determine the value of the player's account 46. Further, the game server 40 queries the database 45 to determine if there are any limitation holds on the player's account 46. The balance of the player's account and status are transmitted to the game server 40. The game server 40 verifies the data and then launches the virtual casino game on the virtual casino game native application 75 on the mobile device 25. The player enters a wager, and each wager is tagged with authentication information and a geographical location generated by the GPS component 305 of the mobile device 25. The wager, along with the authentication and GPS data is transmitted to the game server 40. The game server 40 queries the communications network 51 on which the mobile device 25 operates for the geographical location of the mobile device 25. The communications network utilizes triangulation, nearest cell tower data, or the like to provide an approximate geographical location of the mobile device 25. The communications network 51 transmits the approximate geographical location of the mobile device 25 to game server 40. The game server 40 then determines if the geographical location provided by the native application 75 on the mobile device 25 is within a predefined boundary of the approximate geographical location of the mobile device 25 provided by the communications network 51. If the game server 40 determines that the geographical locations are within the predefined boundary, and if the location is within a permitted gambling jurisdiction, then the game server 40 verifies the balance on the account, the rules and limitations, then places the wager, and returns the result to the virtual casino game native application 75. The game server 40 also transmits the wager and result amount to the database 45 to debit or credit the player's account 46 based on the results of the wager. Each wager made by the player in playing the virtual casino game 76 on the virtual casino game native application 75 undergoes the same procedure.

In this manner, the game server 40 prevents gambling outside of the authorized jurisdiction and prevents fraud against the casino that operates the virtual casino game application 75 since the game server 40 controls the game logic.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for managing games in a mobile virtual casino, the method comprising:

launching a mobile game from a downloaded native mobile application on a mobile communication device, the mobile game one of a plurality of mobile games on the downloaded native mobile application, each of the plurality of mobile games comprising a button to launch the mobile game;

determining on the downloaded native mobile application a GPS location for the mobile communication device by querying a GPS component of the mobile communication device;

creating a secure connection over a network between the downloaded native mobile application of the mobile communication device and a game server;

authenticating an identity of the player, a casino loyalty account number and a mobile device identification number on the downloaded native mobile application of the mobile communication device;

transmitting the identity of the player, the casino loyalty account number, the mobile device identification number and the GPS location of the mobile communication device from the downloaded native mobile application of the mobile communication device over the secure connection to the game server;

requesting from the game server to a communications network operator for the mobile communication device a geographical location for the mobile communication device utilizing cell tower triangulation or nearest cell tower data to determine the geographical location;

determining at the game server that the GPS location and the geographical location are within a predetermined tolerance to verify a location of the mobile communication device within an authorized gambling jurisdiction;

transmitting a user-interface of the mobile game from the game server over the secure connection to the downloaded native mobile application of the mobile communications device over the network once the location is verified;

packaging and transmitting an action of the player and a wager from the downloaded native mobile application of the mobile device over the secure connection to the game server;

authenticating the player, and confirming sufficient credit for the wager at a database of a loyalty site subsequent to receiving the packaged and transmitted action and wager of the player; and tagging the wager with the GPS location and authentication at the downloaded native mobile application of the mobile communication device;

wherein the game server controls a game logic to prevent fraud on a casino.

2. The method according to claim 1 wherein the mobile communication device is a mobile phone or a tablet computer.

3. The method according to claim 1 wherein the virtual casino game is selected from blackjack, roulette, slots, craps, pai-gow, and poker.

* * * * *